(12) United States Patent
Chang et al.

(10) Patent No.: US 11,320,662 B2
(45) Date of Patent: May 3, 2022

(54) LIGHT DEFLECTION FILM AND DISPLAY DEVICE USING THE SAME

(71) Applicant: CM VISUAL TECHNOLOGY CORPORATION, Tainan (TW)

(72) Inventors: Hsin-Wen Chang, Tainan (TW); Kuo-Chang Yu, Tainan (TW)

(73) Assignee: CM VISUAL TECHNOLOGY CORPORATION, Tainan (TW)

( * ) Notice: Subject to any disclaimer, the term of this patent is extended or adjusted under 35 U.S.C. 154(b) by 329 days.

(21) Appl. No.: 16/357,544

(22) Filed: Mar. 19, 2019

(65) Prior Publication Data
US 2019/0324282 A1    Oct. 24, 2019

(30) Foreign Application Priority Data

Apr. 24, 2018    (TW) ................................ 107113889

(51) Int. Cl.
*G02B 27/09*    (2006.01)
*G02F 1/13357*   (2006.01)
*G02F 1/1335*    (2006.01)

(52) U.S. Cl.
CPC ... *G02B 27/0944* (2013.01); *G02F 1/133606* (2013.01); *G02F 1/133607* (2021.01)

(58) Field of Classification Search
CPC .............. G02B 27/0944; G02B 27/095; G02B 27/0955; G02B 27/0961; G02B 27/0966; G02B 27/0972; G02B 5/1861; G02B 5/1828; G02B 5/1876
See application file for complete search history.

(56) References Cited

U.S. PATENT DOCUMENTS

| 8,547,015 B2 | 10/2013 | Wolk et al. |
| 10,647,032 B2 | 5/2020 | Radcliffe et al. |
| 2004/0150885 A1* | 8/2004 | Raguin ................ G02B 5/1861 359/572 |

(Continued)

FOREIGN PATENT DOCUMENTS

| CN | 103168373 A | 6/2013 |
| CN | 106661387 A | 5/2017 |

(Continued)

OTHER PUBLICATIONS

KIPO Office Action dated Feb. 11, 2020.

(Continued)

*Primary Examiner* — Christopher Stanford
*Assistant Examiner* — Journey F Sumlar
(74) *Attorney, Agent, or Firm* — McClure, Qualey & Rodack, LLP

(57) ABSTRACT

A light deflection film and a display device using the same are provided. The display device includes a display panel and a light deflection film. The light deflection film is disposed on the display panel and includes a first layer, a second layer and a light deflection structure formed at an interface between the first layer and the second layer. The first layer has a first refractive index. The second layer is formed on the first layer and has a second refractive index. The first layer of the light deflection film is located between the second layer and the display panel, and the first refractive index is larger than the second refractive index.

10 Claims, 3 Drawing Sheets

(56) References Cited

U.S. PATENT DOCUMENTS

| | | | | |
|---|---|---|---|---|
| 2004/0169929 | A1* | 9/2004 | Sato | G11B 7/1275 359/558 |
| 2005/0057713 | A1* | 3/2005 | Mafune | G02F 1/133555 349/114 |
| 2011/0026208 | A1* | 2/2011 | Utsuro | G03H 1/0244 361/679.01 |
| 2011/0050555 | A1* | 3/2011 | Wong | G02B 27/0905 345/102 |
| 2011/0242846 | A1* | 10/2011 | Park | G02B 19/0066 362/613 |
| 2013/0234178 | A1* | 9/2013 | Mitsugi | H01L 33/60 257/94 |
| 2015/0221693 | A1* | 8/2015 | Saitou | H01L 27/14645 257/432 |
| 2015/0323833 | A1* | 11/2015 | Xie | G02F 1/13439 349/33 |
| 2016/0327219 | A1* | 11/2016 | Hashiya | G02B 6/0003 |
| 2018/0329207 | A1 | 11/2018 | Sitter et al. | |

FOREIGN PATENT DOCUMENTS

| | | |
|---|---|---|
| JP | H1096924 A | 4/1998 |
| JP | 2002318383 A | 10/2002 |
| JP | 200948184 A | 3/2009 |
| JP | 2010210904 A | 9/2010 |
| TW | 201733801 A | 10/2017 |
| WO | 2017100033 A1 | 6/2017 |

OTHER PUBLICATIONS

JPO Office Action dated Apr. 7, 2020 in application No. 2019-075576.

CN Office Action dated Mar. 23, 2021 in Chinese application (No. 201810515723.3).

TIPO Office Action dated Jan. 23, 2019 in Taiwan application (No. 107113889).

* cited by examiner

LIGHT DEFLECTION FILM AND DISPLAY DEVICE USING THE SAME

This application claims the benefit of Taiwan application Serial No. 107113889, filed Apr. 24, 2018, the subject matter of which is incorporated herein by reference.

BACKGROUND OF THE INVENTION

Field of the Invention

The invention relates to a light deflection film and a display device using the same, and more particularly to a light deflection film having a light deflection structure and a display device using the same.

Description of the Related Art

The increasing market demand of large-sized and high-resolution display panels is causing the current technology of display products runs into a bottleneck. Take the 65 inches display panel as an example. In comparison to the 4K products, the 8K products have 4 times of pixels and an increased number of circuits, resulting issues such like decreased aperture ratio, lower utilization rate of the light, more complicated manufacturing process and significantly increased manufacturing cost.

SUMMARY OF THE INVENTION

The invention provides a light deflection film and a display device using the same to solve the problems disclosed above.

According to one embodiment of the present invention, a light deflection film is provided. The light deflection film of the present disclosure is disposed on a light source and includes a first layer having a first refractive index, a second layer formed on the first layer having a second refractive index, and a light deflection structure formed at an interface between the first layer and the second layer. Light emitted from the light source sequentially passes through the first layer and the second layer, and the first refractive index is larger than the second refractive index.

According to another embodiment of the present invention, a light deflection film is provided. The light deflection film of the present disclosure includes a first layer having a first refractive index, a second layer formed on the first layer having a second refractive index, a protection layer formed on the second layer, and a light deflection structure formed at an interface between the first layer and the second layer. The first refractive index is larger than the second refractive index.

According to another embodiment of the present invention, a display device is provided. The display device of the present disclosure includes a display panel and a light deflection film disposed on the display panel. The light deflection film includes a first layer having a first refractive index, a second layer formed on the first layer having a second refractive index, and a light deflection structure formed at an interface between the first layer and the second layer. The first layer is located between the second layer and the display panel, and the first refractive index is larger than the second refractive index.

According to another embodiment of the present invention, a display device is provided. The display device of the present disclosure includes a display panel and a light deflection film disposed on the display panel. The light deflection film includes a first layer having a first refractive index, a second layer formed on the first layer having a second refractive index, a protection layer formed on the second layer, and a light deflection structure formed at an interface between the first layer and the second layer. The first refractive index is larger than the second refractive index.

The above and other aspects of the invention will become better understood with regard to the following detailed description of the preferred but non-limiting embodiment(s). The following description is made with reference to the accompanying drawings.

DETAILED DESCRIPTION OF THE INVENTION

Detailed descriptions of the invention are disclosed below with a number of embodiments. However, the disclosed embodiments are for explanatory and exemplary purposes only, not for limiting the scope of protection of the invention.

Figure 1:
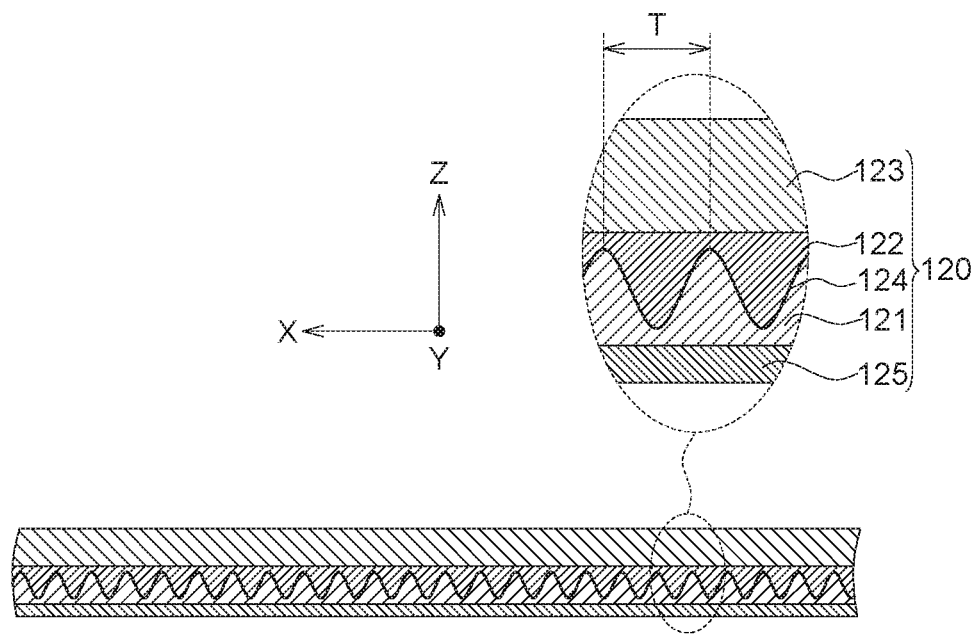
FIG. 1 is a partial cross-sectional view of a light deflection film according to an embodiment of the invention.

FIG. 1 is a partial cross-sectional view of a light deflection film according to an embodiment of the invention. As indicated in FIG. 1, the light deflection film 120 includes a first layer 121 and a second layer 122. The first layer 121 has a first refractive index $N_1$. The second layer 122 is located on the first layer 121 and has a second refractive index $N_2$. The interface between the first layer 121 and the second layer 122 contains a light deflection structure 124. The first refractive index $N_1$ is larger than the second refractive index $N_2$. When the light deflection film 120 is disposed on the light source (not illustrated), light (not illustrated) emitted from the light source sequentially passes through the first layer 121 and the second layer 122.

In an embodiment, the light deflection structure 124 is a micro-structure configured to diffract the incident visible light on the interface. For example, the light deflection structure 124 can be a grating structure defined by the interface between the first layer 121 and the second layer 122. The light deflection structure 124 can have a periodically repeated shape such as a sine wave shape or a square wave shape. Alternatively, the grating structure can be other regular or irregular shapes arranged in periodically repeated manner.

In an embodiment, the first refractive index $N_1$ is between 1.4 and 2. For example, the first refractive index $N_1$ is between 1.5 and 1.8. The second refractive index $N_2$ is between 1.2 and 1.8. For example, the second refractive index $N_2$ is between 1.4 and 1.7. The light deflection structure 124 can have one or more than one period T. The period T is between 0.5 and 20 μm. For example, the period T is between 0.5 and 8 μm.

In an embodiment, each of the first layer 121 and the second layer 122 can be a viscoelastic adhesive layer or an elastic adhesive layer formed of such as pressure sensitive adhesive (PSA), rubber-based adhesive or polysiloxane-based adhesive. Examples of suitable viscoelastic adhesive or elastic adhesive include an elastic polyurethane-based adhesive or a polysiloxane-based adhesive, a styrene-block-copolymer-based adhesive, a (meth)acrylic-block-copolymer-based adhesive, a polyvinyl ether-based adhesive, a polyolefin-based adhesive, and a polymethacrylate-based adhesive. In another embodiment, each of the first layer 121 and the second layer 122 can be a crosslinked resin layer or a soluble resin layer. Examples of suitable material of the crosslinked resin layer include thermosetting resin or UV curing resin formed of such as a (methyl)acrylic-based resin, a urethane-based resin, a (meth)acrylic urethane-based resin, an epoxy-based resin, or a polysiloxane-based resin. In a specific embodiment, the first layer 121 and the second layer 122 both are crosslinked resin layers.

In an embodiment, each of the first layer 121 and the second layer 122 may contain fillers such as inorganic nanoparticles or light diffusing particles for adjusting the refractive index of the layer. Under such circumstances, the refractive index is defined as the average refractive index of the composite material. Examples of suitable nanomaterial include inorganic nanoparticles or organic nanoparticles, such as metal oxide nanoparticles, zirconia, titanium dioxide, aluminum oxide, tin oxide, silicon oxide, or polymethyl methacrylate (PMMA) nanoparticles.

In an embodiment as indicated in FIG. 1, the light deflection film 120 further includes a protection layer 123 located on the second layer 122 and configured to protect the second layer 122. The protection layer 123 can be formed of a synthetic resin. Examples of a material serving as a main component of the protection layer 123 include transparent resins such as a cellulose-based resin, a polyester-based resin, a polyvinyl alcohol-based resin, a polycarbonate-based resin, a polyamine-based resin, a polyimine-based resin, a polyether sulfone-based resin, a polysulfone-based resin, a polystyrene-based resin, a polynorbornene-based resin, polyolefin-based resin, a (meth)acrylic resin, and an acetate-based resin. Examples of the material of the protection layer 123 may also include thermosetting resin or UV curing resin formed of such as (methyl) acrylic, urethane, (meth) acrylic urethane, epoxy, or polyoxyn. Besides, the protection layer 123 can also be formed of vitreous polymer such as oxane-based polymer. In an embodiment, the protection layer 123 may include a functional coating, such as a surface hardening coating, an anti-glare coating or a coating with special functions.

In an embodiment, the light deflection film 120 further includes an adhesive layer 125 located on one side of the first layer 121 opposite to the second layer 122 and configured to adhere the light deflection film 120 to the light source. In an embodiment, the light deflection film 120 may omit the adhesive layer 125. In this specific embodiment, the first layer 121 is a visco-elastic adhesive layer or an elastic adhesive layer, and the second layer 122 is a crosslinked resin layer.

The research shows that the refractive index of the two films of the light deflection film 120 adjacent to the light deflection structure determines the compensation effect of the optical film, and the light deflection film 120 of the invention embodiment provides a better viewing angle compensation effect when the first refractive index $N_1$ is larger than the second refractive index $N_2$.

Figure 2:
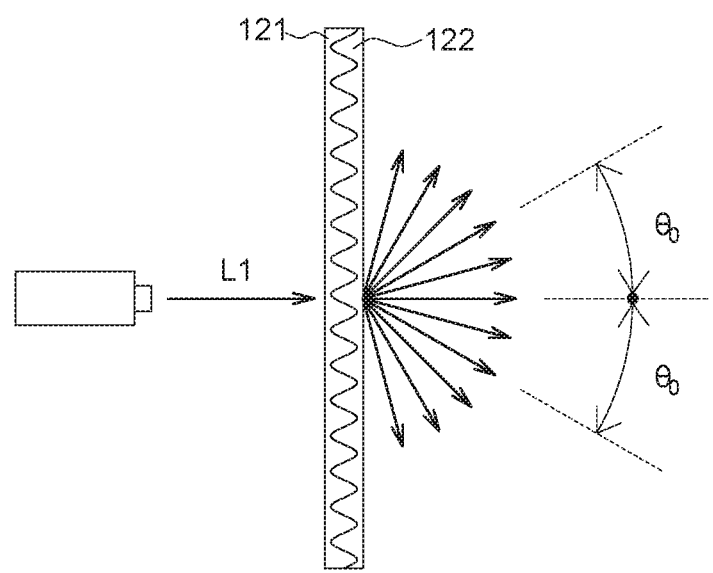
FIG. 2 is a schematic diagram of laser distribution of the light deflection film of FIG. 1.

Referring to FIG. 2, a schematic diagram of laser distribution of the light deflection film 120 is shown in FIG. 1. As indicated in FIG. 2, a laser light L1 (such as a red laser light) is transmitted through the light deflection film 120. The intensity I' is measured by an intensity detector (not illustrated), wherein the intensity I' is the intensity summation of the transmitted light within an angle θ of 25° relative to the extending direction of the incident light. Then, a ratio of the intensity I' to the total intensity I of the laser light L1 (that is, $$\frac{I'}{I})$$

is calculated. The ratio is defined as distribution ratio D.

Based on the above measuring method, when the light is incident on the first layer 121 of the light deflection film 120, the light passes through the light deflection film 120 in the direction from the first layer 121 to the second layer 122 (the light sequentially passes through the layer with a higher refractive index first and the layer with a lower refractive index in order), and the obtained distribution ratio is defined as the distribution ratio $D_A$. When the light is incident on the second layer 122 of the light deflection film 120, the light passes through the light deflection film 120 in the direction from the second layer 122 to the first layer 121 (the light sequentially passes through the layer with a lower refractive index first and the layer with a higher refractive index in order), and the obtained distribution ratio is defined as the distribution ratio $D_B$.

The result shows that the distribution ratio $D_A$ of the light deflection film 120 of the invention embodiment is smaller than the distribution ratio $D_B$. That is, when the light passes through the light deflection film 120 with the light being incident on the first layer 121, the intensity distribution within the angle $\theta_0$ is smaller than the intensity distribution outside the angle. That is, the light deflection film 120 has a larger viewing angle of diffractive distribution with the light being incident on the first layer 121. Thus, the split light generated by the light deflection film 120 on the display device 100 with the light being incident on the first layer 121 covers a wider range of viewing angle. Therefore, the light deflection film 120 can solve the problems such as the color shift at large viewing angle, the whitening phenomenon of frame, and the inversion of grayscales.

Also, the light deflection film 120 has at least one of the following features (1) to (4): (1) $D_A$ is between 0.99 and 0.3.

$$\frac{D_A}{1-D_A} \tag{2}$$

is between 50 and 0.4.

$$\frac{D_B}{D_A} \tag{3}$$

is between 1.03 and 3. (4) $|D_B-D_A|$ is between 0.03 and 2. The values of $D_A$, $D_B$, $$\frac{D_A}{1-D_A}, \frac{D_B}{D_A}$$

and $|D_B-D_A|$ obtained from the laser distribution test performed under different values of period T, first refractive index $N_1$ and second refractive index $N_2$ are listed in the Table 1.

TABLE 1

| Ex | T | $N_1$ | $N_2$ | $D_A$ | $\dfrac{D_A}{1-D_A}$ | $D_B$ | $\dfrac{D_B}{D_A}$ | $|D_B - D_A|$ |
|---|---|---|---|---|---|---|---|---|
| 1 | 0.9 | 1.68 | 1.53 | 0.86 | 6.142 | 0.877 | 1.02 | 0.02 |
| 2 | 1.3 | 1.68 | 1.54 | 0.76 | 3.167 | 0.81 | 1.09 | 0.05 |
| 3 | 2.0 | 1.60 | 1.53 | 0.90 | 9 | 0.98 | 1.09 | 0.08 |
| 4 | 4.0 | 1.64 | 1.54 | 0.85 | 5.667 | 0.97 | 1.14 | 0.12 |
| 5 | 5.6 | 1.68 | 1.53 | 0.79 | 3.762 | 0.93 | 1.18 | 0.14 |

As indicated in Ex 1 of Table 1, for a light deflection film with the period T=0.9 μm, the first refractive index $N_1$=1.68, and the second refractive index $N_2$=1.53, the obtained distribution ratio $D_A$ is 0.86, distribution ratio $D_B$ is 0.877, and the ratio $$\frac{D_B}{D_A}$$

is 1.02.

As indicated in Ex 2 of Table 1, for a light deflection film with the period T=1.3 μm, the first refractive index $N_1$=1.68, and the second refractive index $N_2$=1.54, the obtained distribution ratio $D_A$ is 0.76, distribution ratio $D_e$ is 0.81, and the ratio $$\frac{D_B}{D_A}$$

is 1.07.

As indicated in Ex 3 of Table 1, for a light deflection film with the period T=2 μm, the first refractive index $N_1$=1.60, and the second refractive index $N_2$=1.53, the obtained distribution ratio $D_A$ is 0.9, distribution ratio $D_B$ is 0.98, and a ratio $$\frac{D_B}{D_A}$$

is 1.09.

As indicated in Ex 4 of Table 1, for a light deflection film with the period T=4 μm, the first refractive index $N_1$=1.64, and the second refractive index $N_2$=1.54, the obtained distribution ratio $D_A$ is 0.85, a distribution ratio $D_B$ is 0.97, and a ratio $$\frac{D_B}{D_A}$$

is 1.14.

As indicated in Ex 5 of Table 1, for a light deflection film with the period T=5.6 μm, the first refractive index $N_1$=1.68, and the second refractive index $N_2$=1.53, the obtained distribution ratio $D_A$ is 0.79, a distribution ratio $D_B$ is 0.93, and a ratio $$\frac{D_B}{D_A}$$

is 1.18.

As indicated in Table 1, in comparison to the arrangement with the first refractive index $N_1$ being smaller than the second refractive index $N_2$, the distribution ratio $D_A$ is smaller than the distribution ratio $D_B$ with the first refractive index $N_1$ being larger than the second refractive index $N_2$. Thus, it can be concluded that the light deflection film 120 would have a wider range of viewing angle compensation with the light being incident on the layer having a higher refractive index (the first layer 121).

Figure 3A:
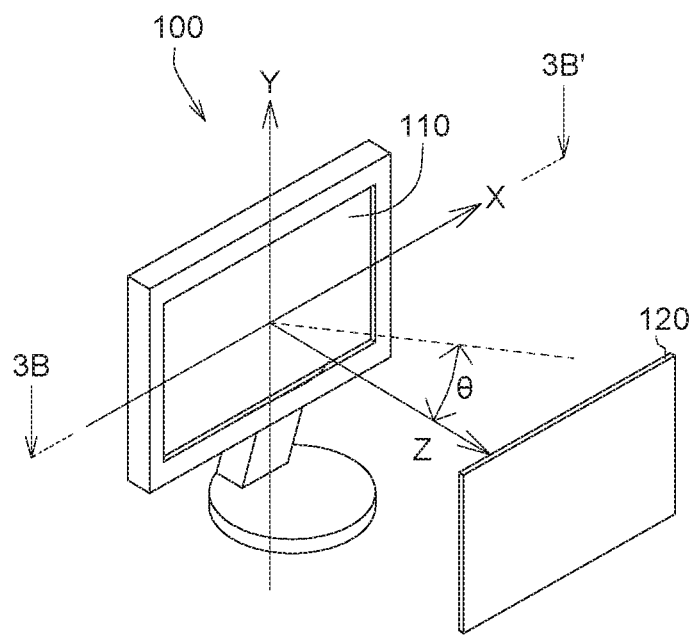
FIG. 3A is a schematic diagram of a display device according to an embodiment of the invention.
Figure 3B:
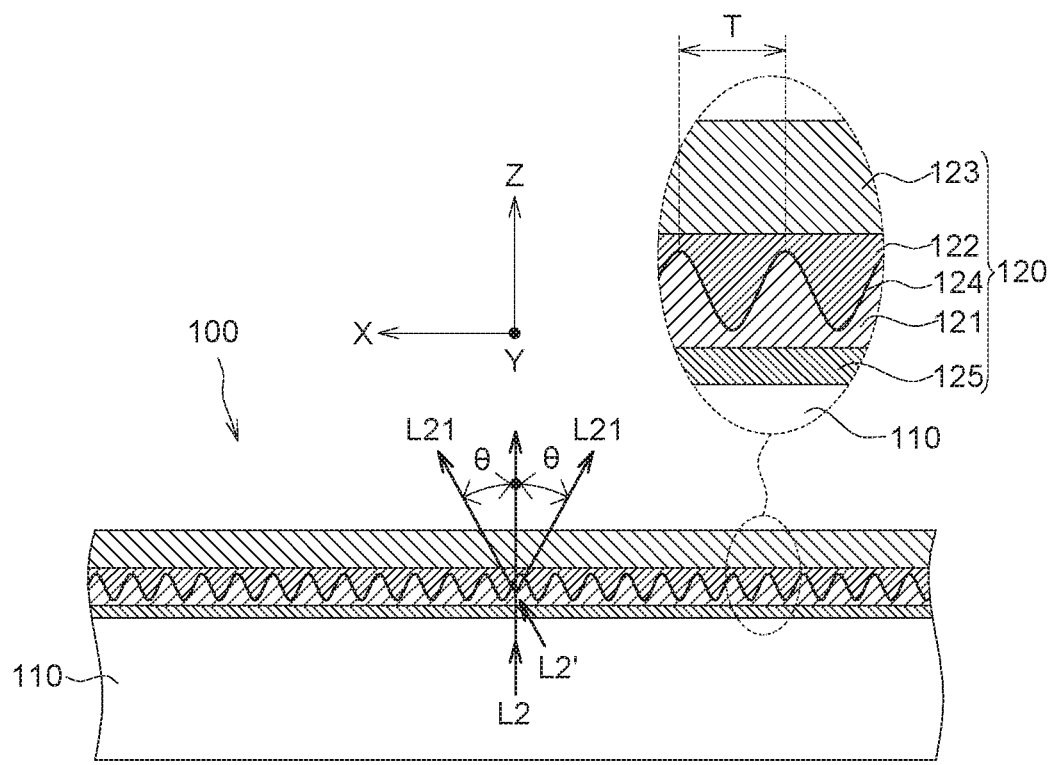
FIG. 3B is a cross-sectional view of the display panel, the light deflection film and the adhesive layer of the display device FIG. 3A along a direction 3B-3B'.

Refer to FIGS. 3A and 3B. FIG. 3A is a schematic diagram of a display device 100 according to an embodiment of the invention. FIG. 3B is a cross-sectional view of the display panel 110, the light deflection film 120 and the adhesive layer 125 of the display device 100 of FIG. 3A along a direction 3B-3B'. As indicated in FIGS. 3A and 3B, two orthogonal lines on the plane parallel to the display surface of the display panel 110 are selected as coordinate axes. For example, the horizontal line directed to the right is referred as the X axis and the vertical line directed to the top is referred as the Y axis, and the axis perpendicular to the display surface of the display panel 110 is defined as the Z axis.

As indicated in FIGS. 3A and 3B, the display device 100 includes a display panel 110, and the light deflection film 120 is disposed on the light emitting side of the display panel 110. In the present embodiment, the display panel 110 is exemplified by a liquid crystal display panel. In other embodiments, the display panel 110 is not limited to the liquid crystal display panels, and can also be realized by a self-illuminating display panel, such as an organic light emitting diode display panel.

As indicated in FIG. 3B, the light deflection film 120 is attached onto the display panel 110 through an adhesive layer 125, and the first layer 121 of the light deflection film 120 is located between the second layer 122 and the display panel 110. In an embodiment, the adhesive layer 125 can be formed on the first layer 121 in advance (refer to the structure of FIG. 1), and then be adhered on the display panel 110. Or, the adhesive layer 125 can be firstly formed on the display panel 110. After that, the first layer 121 of the light deflection film 120 can be adhered on the display panel 110 through the adhesive layer 125.

After the light L2 emitted from the display device 100 passes through the light deflection film 120, the light L2 is deflected by the light deflection structure of the light deflection film 120 and generates a split light L21 (or a diffracted light). The split light L21 can make compensation to the color-shifted light L2' generated by the display panel 110 at different viewing angles; therefore, the light deflection film 120 decreases the level of color shift on the displays of the display device 100.

More specifically, take, for example, the liquid crystal display panel 110. The light L2 normally (along the Z axis) passing through the liquid crystal molecules of the display panel 110 is free of color shift (or has a minimum level of color shift), but the light (referred as the color-shifted light L2' hereinafter) passing through the liquid crystal molecules at the view angle θ has color shift. The split light L21 generated by the light L2 after being deflected by the light deflection structure is also free of color shift (or has a minimum level of color shift), and therefore can compensate the color-shifted light L2' at the same view angle θ within the distribution range of the diffracted light to reduce the color shift level of the displays of the display device 100 within the view angle θ. Although only the split light L21 within the view angle θ illustrated in FIG. 3B, the split light L21 can be generated within the view angle θ between 0 to 90° with respect to the Z axis.

Owing to the structural design of the light deflection film 120 of the embodiments in present invention, the color shift level of the displays of the display device 100 viewed by the viewer views at the view angle θ can be reduced due to the compensation effect of the diffracted light.

Figure 4:
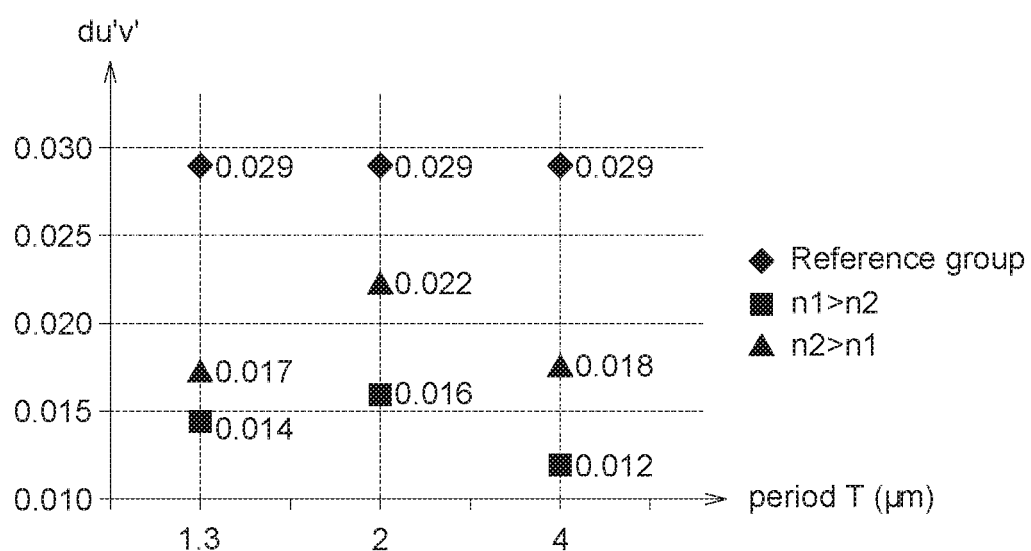
FIG. 4 is a schematic diagram of improvement in color shift with the light deflection film of FIG. 3B being used in the display device.

Refer to FIG. 4, a schematic diagram of improvement in color shift with the light deflection film 120 of FIG. 3B being used in the display device is shown. FIG. 4 illustrates the variations in chroma coordinate (du'v', the color shift value) measured at a view angle of 60° with the light deflection film in several embodiments being used in the display device 100. In FIG. 4, the color shift values of the display device 100 measured with the first layer 121 of the light deflection film 120 being adhered on the light emitting surface of the display panel 110 are represented by square dots; the color shift values of the display device 100 measured with the second layer 122 of the light deflection film 120 being adhered on the light emitting surface of the display panel 110 are represented by triangle dots; the color shift values of the display device 100 measured without the light deflection film 120 are represented by diamond dots (reference group). The smaller color shift values represent the better improvements in color shift.

As indicated in FIG. 4, the color shift value of the display device 100 is 0.014, wherein the light deflection structure has a period T of 1.3 μm and the light deflection film 120 is pasted on the display panel 110 through the first layer 121; the color shift value of the display device 100 is 0.017, wherein the light deflection film 120 is pasted on the display panel 110 through the second layer 122; and the color shift value of the display device 100 without the light deflection film 120 is 0.029. The display device 100 provides the smallest color shift value with the first layer 121 of the light deflection film 120 being pasted on the display panel 110. That is, the color shift of the display device 100 is significantly improved with the first layer 121 of the light deflection film 120 being pasted on the display panel 110.

Similarly, as indicated in FIG. 4, in the embodiments of the light deflection structures have periods T of 2 μm and 4 μm respectively, the color shifts of the display device 100 are also significantly improved with the first layer 121 of the light deflection film 120 being pasted on the display panel 110.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display device, comprising:
    a display panel; and
    a light deflection film disposed on the display panel comprising:
    a first layer having a first refractive index;
    a second layer formed on the first layer and having a second refractive index; and
    a light deflection structure formed at an interface between the first layer and the second layer;
    wherein the first layer of the light deflection film is located between the second layer and the display panel, and the first refractive index is larger than the second refractive index, wherein the light deflection structure has a period between 0.5 and 20 μm, and a distribution ratio $D_A$ of the light deflection film measured with the light being incident on the first layer is smaller than a distribution ratio $D_B$ of the light deflection film measured with the light being incident on the second layer,
    wherein a color shift value of the display panel with the first layer of the light deflection film being adhered on a light emitting surface of the display panel is less than a color shift value of the display panel with the second layer of the light deflection film being adhered on the light emitting surface of the display panel.

2. A display device, comprising:
    a display panel; and
    a light deflection film disposed on the display panel comprising:
    a first layer having a first refractive index;
    a second layer formed on the first layer and having a second refractive index;
    a protection layer formed on the second layer; and
    a light deflection structure formed at an interface between the first layer and the second layer;
    wherein the first refractive index is larger than the second refractive index, wherein the light deflection structure has a period between 0.5 and 20 μm, and a distribution ratio $D_A$ of the light deflection film measured with the light being incident on the first layer is smaller than a distribution ratio $D_B$ of the light deflection film measured with the light being incident on the second layer,
    wherein a color shift value of the display panel with the first layer of the light deflection film being adhered on a light emitting surface of the display panel is less than a color shift value of the display panel with the second layer of the light deflection film being adhered on the light emitting surface of the display panel.

3. A light deflection film disposed on a display panel and comprising:
    a first layer having a first refractive index;
    a second layer formed on the first layer and having a second refractive index;
    a protection layer formed on the second layer; and
    a light deflection structure formed at an interface between the first layer and the second layer;
    wherein the first refractive index is larger than the second refractive index, wherein the light deflection structure has a period between 0.5 and 20 μm, and a distribution ratio $D_A$ of the light deflection film measured with the light being incident on the first layer is smaller than a distribution ratio $D_B$ of the light deflection film measured with the light being incident on the second layer,
    wherein a color shift value of the display panel with the first layer of the light deflection film being adhered on a light emitting surface of the display panel is less than a color shift value of the display panel with the second layer of the light deflection film being adhered on the light emitting surface of the display panel.

4. The light deflection film according to claim 3, wherein the distribution ratio $D_A$ is between 0.99 and 0.3.

5. The light deflection film according to claim 4, wherein $D_A/(1-D_A)$ is between 1 and 10.

6. The light deflection film according to claim 3, wherein the light deflection structure has a period between 0.5 and 20 µm.

7. The light deflection film according to claim 3, wherein the first refractive index is between 1.4 and 2.

8. The light deflection film according to claim 3, wherein the second refractive index is between 1.2 and 1.8.

9. The light deflection film according to claim 3, wherein $D_B/D_A$ is between 1.03 and 3.

10. The light deflection film according to claim 3, wherein $|D_B-D_A|$ is between 0.03 and 2.

* * * * *